June 9, 1959
H. J. HUBERS
2,890,045
DEVICE FOR DRIVING PERFORATED PICTURE FILM TAPE
BY MEANS OF A CONSTANT SPEED SPROCKET
Filed June 8, 1955
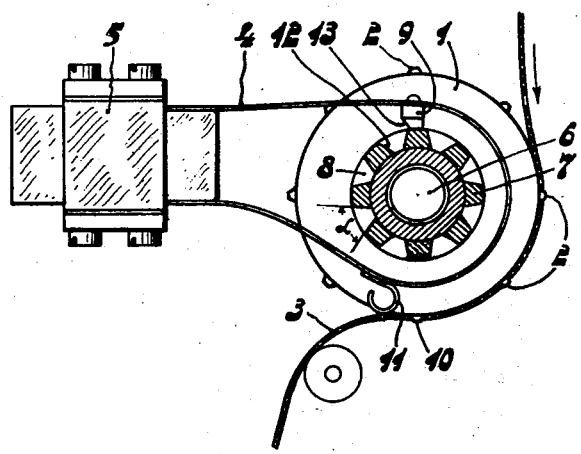
INVENTOR
HENDRIK JAN HUBERS
BY
AGENT

United States Patent Office 2,890,045
Patented June 9, 1959

2,890,045

DEVICE FOR DRIVING PERFORATED PICTURE FILM TAPE BY MEANS OF A CONSTANT SPEED SPROCKET

Hendrik Jan Hubers, Eindhoven, Netherlands, assignor, by mesne assignments, to North American Philips Company, Inc., New York, N.Y., a corporation of Delaware Application June 8, 1955, Serial No. 514,077

Claims priority, application Netherlands June 15, 1954

3 Claims. (Cl. 271—2.3)

In U.S. patent application Serial No. 410,659, filed February 16, 1954, now U.S. Patent No. 2,789,816, a device for driving perforated picture film tape by means of a constant speed sprocket has been proposed in which the tooth-pitch is made at least equal to the length of a picture frame on the non-shrunk film tape and in which the picture frames are successively illuminated or scanned, while in the period between the illuminating or scanning of a picture frame and the illuminating or scanning of the next subsequent picture frame the film tape is struck off the driving tooth (or teeth) of the sprocket by a fixed spring which is periodically released from a pre-determined initial position.

In order to prevent the spring from being in constant vibration during operation of the device it may be provided with dampening means arranged transversely to it so that the initial position is better determined. However, it has been found in practice that it was difficult to realize this satisfactorily.

It is an object of the invention to provide another manner of attaining a pre-determined initial position.

According to the invention the spring, after having been released from the pre-determined initial position, is intercepted after a period of time which is equal to the vibration period of the fixed spring.

The aforesaid enables the spring to be intercepted or engaged and moved by the sprocket precisely at the instant at which the velocity of all points of the spring is zero which occurs at least some time after the device has reached its correct speed. For after having been released from the initial position the spring will return to this initial position after its natural vibration period. It is assumed that the spring has very slight internal damping and that the work done by the spring during a vibration period is small compared with the energy stored in the spring. If it should be found in practice that this assumption does not apply, the velocity of all points of the spring will be zero after a period of time which is equal to the natural vibration period of the fixed spring, but the spring will not completely return to its initial position. However, in this event also the spring can be intercepted precisely at the moment at which the velocity in all its points is zero and thereupon be returned by the interception device to its initial position by a suitable choice of said interception device. As a result the initial position is determined by the fact that the spring does not vibrate in this initial position. The interception device might, for example, consist of a magnetic field produced by a coil which is excited periodically. A simple embodiment of the interception device is a spoked element. The latter embodiment provides the additional advantage that the rattling noise of the spring is materially reduced by its co-operation with the spoked element.

In a preferred embodiment, in which the spring is intercepted by a spoked element, the spoked element may consist in the simplest case, in which the internal material damping of the spring is zero and the external work done by the spring during a vibration period is also zero, of a circular disc which is continuously driven about its axis and the circumference of which comprises a recess extending through an angle which is traversed in the vibration period of the fixed spring. However, in practice the spring exhibits internal material damping and also is required to do external work. The amplitude reduction produced in practice due to internal damping and external work is, however, such that the rounded transitional part which is invariably provided between the recess and the circumference of the disc will suffice to return the spring to its initial position. Thus, it is ensured in a simple manner that the spring is intercepted by the circular circumference of the spoked element in its initial position i.e. with a velocity of the spring which is equal to zero.

The realization of the above-mentioned principle presents difficulty in a device in which the natural vibration period of the spring is much less than the time of revolution of the spoked element or in which the spoked element consists of a disc disposed coaxially with and directly coupled to the sprocket, since in this event the circular disc should comprise the same number of recesses as there are teeth on the sprocket. The spoked element should in this event enable the spring to move substantially freely, which the available space does not permit.

According to a further feature of the invention the spring in these cases comprises a projection for co-operation with the spoked element. This projection may readily be proportioned such as to have sufficient freedom of movement in a recess provided in the circumference of the disc relatively to the movement of the spring. In the case of a spoked element disposed co-axially with the sprocket, a single disc the number of revolutions of which corresponds to that of the sprocket will suffice.

In order to enable the device to be put into operation without further expedients when the projection is not situated on the circumference of the spoked element but happens to be situated in a recess, in which position the spring consequently is not loaded, according to a further feature of the invention the projection is provided with an inclined edge with the result that the spring from the rest position is caused to assume the initial position automatically.

The invention will now be described more fully with reference to the accompanying diagrammatic drawing in which an embodiment thereof is shown by way of example.

In the single figure of the drawing a sprocket 1 comprises teeth 2 over which a film 3 runs. A U-shaped, band-like spring 4 is fixed at both ends in a clamping device 5 and is bent so as to surround a driving shaft 6 of the sprocket 1. The driving shaft 6 carries a spoked element 7 shaped in the form of a circular disc from the circumference of which at 8 identical portions are removed each through an angle $\alpha$ which is made such that it is traversed in the period of vibration of the fixed spring 4. The spring 4 comprises a projection 9 for co-operation with the spoked element 7, which projection in the initial position of the spring 4 is arranged on the circumference of the spoked element 7 and is released by the recesses 8 in order to release the spring 4. The spring is provided with a member 11 for striking the film 3 from a driving tooth 10. The recesses 8 and the projection 9 comprise co-operating inclined edges 12 and 13 respectively so that the spring is automatically caused to assume the initial position if the projection 9 is inoperative and is situated in a recess 8. When the spoked element 7 is rotated the inclined edge 12 climbs up the inclined edge 13 so that the projection together with the spring is raised. In order to permit of correct adjustment the spoked element is rotatable relatively to the sprocket 1 and can be locked, while the natural vibration period of the spring 4 is adjustable by means of the clamping device 5.

What is claimed is:

1. In apparatus of the class described having a film gate, a film driving device for a perforated, non-shrunk motion picture film comprising a constant-speed, toothed sprocket, the tooth pitch of which is at least equal to the length of a picture frame of said film, a spring fixed on both ends and which has an intermediate portion that moves in a vibratory manner from a predetermined initial position to thereby strike off the film from the teeth of said sprocket when the picture frames are not being scanned, said spring being under continued tension, and means for intercepting said spring after being released from said predetermined initial position and after a period of time equal to the vibration period of said fixed spring.

2. A film driving device as set forth in claim 1 wherein said means is a spoked element being a circular disc having at least one recess cut in the periphery of the disc and extending through an angle which is traversed in the vibration period of said fixed spring, a projection mounted on said spring for co-action with said spoked element whereby said spring is moved in a vibratory manner by said spoked element when the latter is rotated.

3. A film driving device as set forth in claim 2 wherein said projection is provided with an inclined edge and said recess with a correspondingly-sloped side whereby said spring is returned from a rest position to said initial position automatically.

References Cited in the file of this patent

UNITED STATES PATENTS 2,569,280    Bedford _____ Sept. 25, 1951